United States Patent [19]

Bisenius et al.

[11] Patent Number: 4,744,343

[45] Date of Patent: May 17, 1988

[54] DEVICE FOR CONTROLLING AN INTERNAL COMBUSTION ENGINE

[75] Inventors: Jean-Claude Bisenius, Darmstadt; Heinz Decker, Vaihingen/Enz; Richard Schleupen, Ingersheim, all of Fed. Rep. of Germany

[73] Assignee: Robert Bosch GmbH, Stuttgart, Fed. Rep. of Germany

[21] Appl. No.: 859,623

[22] Filed: May 2, 1986

[30] Foreign Application Priority Data

Jun. 12, 1985 [DE] Fed. Rep. of Germany ....... 3520998

[51] Int. Cl.$^4$ ...................... F02D 41/30; F02P 7/067
[52] U.S. Cl. .................................. 123/476; 123/617
[58] Field of Search ............... 123/414, 617, 476, 494, 123/612, 146.5 A, 643

[56] References Cited

U.S. PATENT DOCUMENTS

| 3,915,131 | 10/1975 | Brungsberg | 123/414 |
| 4,180,753 | 12/1979 | Cook, II | 123/617 |
| 4,378,004 | 3/1983 | Petrie | 123/643 |

FOREIGN PATENT DOCUMENTS

| 1576687 | 11/1970 | Fed. Rep. of Germany | 123/414 |
| 2847522 | 5/1980 | Fed. Rep. of Germany | . |
| 54-25337 | 2/1979 | Japan | 123/146.5 A |
| 57-76266 | 5/1982 | Japan | 123/612 |

Primary Examiner—Andrew M. Dolinar
Attorney, Agent, or Firm—Michael J. Striker

[57] ABSTRACT

A device for controlling ignition or fuel injection and the like of an internal combustion engine includes an angular position sensor of a shaft of the engine. The sensor is in the form of a disc rotating together with the shaft and being provided on its periphery with as many radially projecting segments separated by gaps as many cylinders has the engine. A gap between the segments is provided with a single sloping ramp terminating with a steep flank. The flank of one segment and the steep flank of the ramp cooperate with a detector which generates a marking pulse coordinating during single rotation of the shaft the distribution of control pulses to respective cylinders.

6 Claims, 3 Drawing Sheets

DEVICE FOR CONTROLLING AN INTERNAL COMBUSTION ENGINE

BACKGROUND OF THE INVENTION

The present invention relates to a device for controlling operation of an internal combustion engine having a rotary shaft and means for sensing angular position of the shaft, the sensing means including a sensor disc arranged for joint rotation with the shaft and having on its periphery as many segments as many cylinders has the engine, and a stationary detector for detecting flanks of the segments, the detector generating signals applied to a control circuit for controlling ignition, and/or fuel injection and the like of the engine.

Prior art devices for controlling or regulating the operation of the engine of a motor vehicle, particularly the ignition, fuel injection and the like, employ sensor systems for detecting the angular position of a shaft of the engine, particularly of the crank shaft or of the cam shaft. Such sensor systems usually include sets of segments provided on the circumference of a sensor disc rotating jointly with the shaft. The number of the segments is proportional to the number of cylinders of the engine to provide markings extending over predetermined time intervals or angular ranges during the rotation of the shaft. For detecting the angular position of a crank shaft the number of the segments amounts to the half of the number of cylinders while for detecting the angular position of a cam shaft the number of the segments is equal to that of the cylinders because, as known, the crank shaft rotates with a doubled rotary speed of the cam shaft. Therefore, in the case of the cam shaft each segment is assigned to one cylinder, whereas in the case of a crank shaft each segment is assigned to two cylinders and the ingition or fuel ejection cycles are controlled in response to the passage of the flanks of respective segments by a fixed detector. The stationary detector reacts to the leading flange of each segment and by a suitable design of the length of respective segments the timing for the operation of the engine is controlled. However, sensor systems using segments of the same configuration have the disadvantage of limited application, namely they do not provide sufficient control in the case of a distributorless semiconductor ignition, or in the case of a two circuit high voltage distribution (for example in eight cylinder engines).

Known are also sensor arrangements in which individual segments are subdivided by a number of teeth and gaps between the teeth. Signals generated by the detector in response to the teeth and gaps are applied to a controlling circuit. The angular position of the shaft is determined by counting the circulating teeth or gaps. This arrangement is relatively expensive and requires additional counting devices. Moreover, if a segment is formed with a single tooth gap only, there is the risk of releasing additional ignition by the trailing edge of the gap.

From the German publication DE-OS No. 28,47,552.1 it is also known to shape all segments of a sensor disc in the form of sloping ramps whereby one of the ramps slopes in opposite direction than the remaining ramps. This known arrangement, however, has the disadvantage that the steep flanks of the ramps produced only needle-shaped pulses. For controlling the ignition of an internal combustion engine, however, it is desirable to provide switch-on pulses which have a different shape than switch-off pulses.

Furthermore, all prior art sensor devices upon starting the device require at least one rotation in order to recognize accurately the correlation of the markings.

SUMMARY OF THE INVENTION

It is, therefore, a general object of this invention to provide an improved engine controlling device which avoids the disadvantages of the prior art devices.

In particular, it is an object of this invention to provide such a controlling device which is suitable for use in distributorless semiconductor ignition systems or in two-circuit high voltage distributors.

Another object of this invention is to provide such an improved controlling device which operates with a single angular position sensor for generating electrical marking signals both at the beginning and at the end of each segment.

Still another object of this invention is to provide such an improved device whose electrical signals (markings) enable an unambiguous assignment to different groups of cylinders in a distributorless or two-circuit high voltage distribution ignition.

In keeping with these objects and others which will become apparent hereafter, one feature of this invention resides in the provision of a controlling device of the before-described kind whose sensor disc comprises a single sloping ramp arranged in a gap between two radial segments on the periphery of the sensor disc. The detector cooperating with the sensor disc generates in response to the ramp different signals than those in response to the flanks of the segments. Preferably, the sloping surface of the ramp starts at the base of a steep flank of one segment and ends at the level of the segments at a distance from the flank of the subsequent segment. In the modification, the radial segments enclose substantially the same central angle on the disc, at least one of the segments is formed with a sloping ramp surface descending its leading flank and terminating a relatively short distance from its trailing flank to form a relatively narrow trailing projection defining two steep flanks, the ramp surface and the narrow trailing projection generating marking pulses indicative of a predetermined range of angular positions of a shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
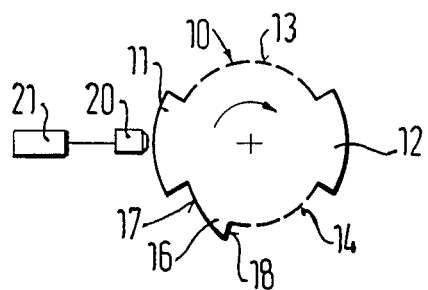
FIG. 1 is a schematic representation of an embodiment of a sensor disc with the associated detector and controlling circuit.

Referring firstly to FIG. 1, reference numeral 10 indicates a sensor disc rotating jointly with the crank shaft or a cam shaft of an internal combustion engine. The sensor disc 10 is provided on its circumference with radial segments 11, 12 separated by gaps 13 and 14. In this example, there are provided two diametrically opposed equal segments separated by two equal gaps. If the disc 10 is mounted on a crank shaft of the engine, the device is suitable for controlling a four cylinder engine. According to this invention, a sloping ramp 16 is formed in the gap 14. Its sloping surface 17 ascends in the direction of rotation of the disc from the base of the trailing flank of segment 11 and terminates at the level of respective segments with a steep flank 18. The height of flank 18 thus corresponds to the heights of the flanks of both segments 11 and 12.

Figure 8:
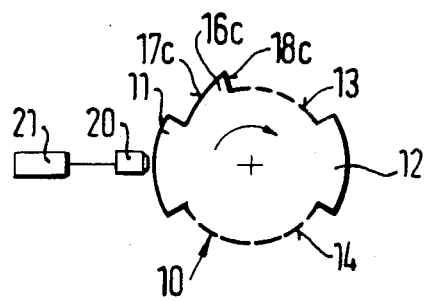
FIG. 8 is another modification of the sensor disc of FIG. 1 for use in a four cylinder engine.

In a modification shown in FIG. 8, it is also possible to provide the ramp 16c in the other gap 13 before the segment 11. In this case the sloping surface 17c of the ramp descends in the direction of rotation of the disc 10.

A detector 20 is arranged at a close proximity to the circumference of the disc 10 and its output is connected to a controlling circuit 21. The interaction of the detector 20 and of the sensor disc 10 can be based on different principles. If electromagnetic interaction is used, the sensor disc 10 is stamped out of a ferromagnetic metal sheet, and the detector 20 senses variations caused by magnetic induction. The stationary detector 20 in rest condition of the disc generates a stable magnetix flux.

When the disc 10 of FIG. 1 starts rotating clockwise, detector 20 first picks up the magnetic change caused for example by the leading edge of segment 11. The ignition process can be triggered at an angular position corresponding to the detection of the trailing edge of the segment 11.

Figure 2:
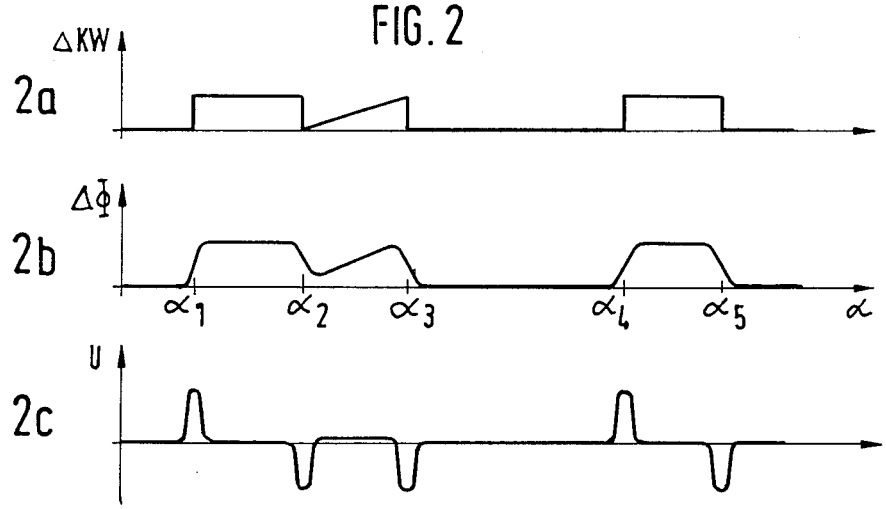
FIG. 2 shows diagrams of the opertion of the angular position sensor for controlling device of this invention.

FIG. 2 illustrates the time course of the generation of controlling signals in response to the rotating segments 11, 12 or gaps 13 and 14 and of the ramp 16. FIG. 2A illustrates the changes Δ KW of the distance between detector 20 and the periphery of the sensor disc relative to the angle of rotation of the sensor disc. FIG. 2B illustrates the relationship between magnetic flux ΔΦ versus angle of rotation α of the sensor disc, and FIG. 2C shows the corresponding electrical pulses generated by the detector 20. When the sensor 10 rotates clockwise as indicated by arrow, then at angular position α1 the leading flank of segment 11 passes by the detector 20 and the latter picks up an increase in the magnetic flux and this change is converted in a positive electrical pulse. Then the magnetic flux remains at the same level until angular position α2 and consequently during this time interval no electrical pulse is induced. In the angular position α2, the detector 20 senses the trailing edge of segment 11 and consequently the detected magnetic flux drops. Accordingly, an electrical pulse of opposite polarity is induced. Then the detector 20 senses the sloping surface 17 of ramp 16 and consequently up to the angular position α3 a gradually increasing magnetic flux is sensed. In the rest of the gap 14 between the angular positions α3 and α4 the magnetic flux remains unchanged, whereupon in the angular range between α4 and α5 the second segment 12 is detected and the corresponding pulses analogous to the segment 11 are generated.

It will be seen from FIG. 2C, that the flanks of respective segments 11 and 12 induce a leading positive pulse followed by a trailing negative pulse whereby the uniformly curved surfaces on the top of the segments and on the bottom of the gaps do not induce any electrical signals. Due to the gradually sloping surface 17 of the ramp 16 there is produced in the range between α2 and α3 a low positive pulse of the same height followed by a high negative pulse corresponding to the steep flank 18 of the ramp 16. The negative pulse at the angular position α3 is employed as a marking pulse in the controlling circuit 21 illustrated in FIG. 3.

Figure 3:
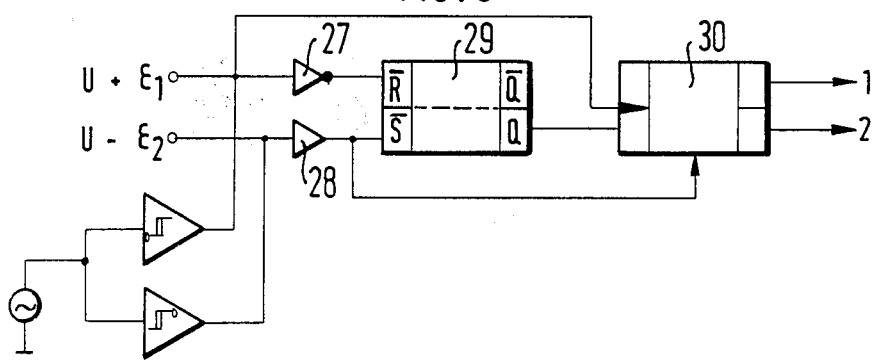
FIG. 3 is a schematic block diagram of the controling circuit for processing the pulses picked up by the detector.

Pulses generated by detector 20 in response to the changes caused by segments 11 and 12 and the ramp 16 are applied via two Schmitt-triggers to input terminals E1 and E2 of the input part of the circuit 21 illustrated in FIG. 3. The Schmitt-triggers operate at different switching thresholds. A positive signal U+ is applied to the terminal E1 whereas a negative signal U− is applied to the other terminal E2. Terminal E1 is connected via an inverter 27 to the inverting reset input of a flipflop 29. The terminal E2 is connected via a buffer 28 to a inverting set input of the flipflop 29. The Q output of the flipflop is connected to clear enable input of a counter 30. The inverting clear input of counter 30 is connected to the output of buffer 28. Counting input of counter 30 is connected to terminal $E_1$ to receive the positive signals U+ before their inversion in inverter 27. The two outputs of counter 30 are connected to a corresponding two groups of cylinders of a four cylinder engine. The circuit of FIG. 3 serves for generating a synchronizing pulse which enables at starting of the engine an accurate correlation of the position of the sensor disc to the actual position of the shaft. Of course, the illustrated evaluation circuit is applicable for all engines having an even number of cylinders. In the case of asymmetrical engines care must be taken that the asymmetry takes place within one rotation of the crank shaft.

Figure 4:
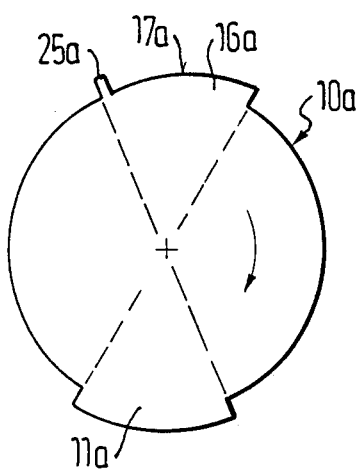
FIG. 4 shows another embodiment of a sensor disc for use in a four cylinder engine having distributorless ignition or for a high voltage distributor.

FIG. 4 shows an embodiment of the sensor disc 10a suitable for four cylinder having distributorless or a high voltage distributor ignition. In this embodiment there is only a single radially projecting segment 11a and a diametrically opposite ramp 16a. The ramp 16a replaces the major parts of the segment 12 in the embodiment of FIG. 1 and starts from a leading flank of a narrow projection 25a which will be explained below. The sloping surface 17a of the ramp 16a decreases in height in the direction of rotation of the sensor disc. The trailing flank of the narrow projection 25a and the leading steep flank of the ramp includes the same central angle as that of the juxtaposed radial segment 11a. The trailing flank of projection 25a coincides for example with the upper dead center of a shaft of the engine.

Figure 5:
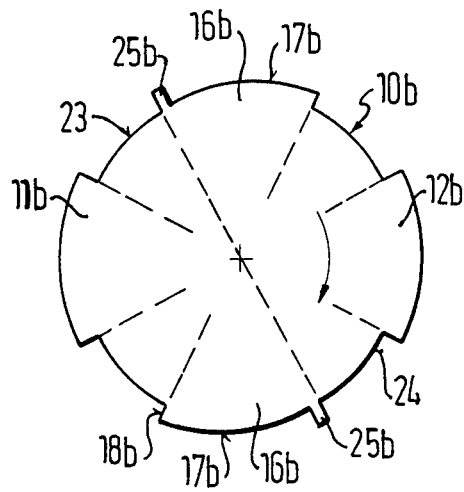
FIG. 5 is a modification of the sensor disc of FIG. 4 for use in an eight cylinder engine having a two-circuit distributor.

FIG. 5 illustrates a modification of the sensor disc of FIG. 4 for use in an eight cylinder engine having a two-circuit distributor. Like component parts are indicated by the same reference numbers. The difference of this embodiment with regard to the embodiments of FIGS. 1 and 4 resides in the provision of two equally long ramps 16b formed together with corresponding narrow projections 25b into diametrically opposed segments. For controlling an eight cylinder engine, there are created two additional gaps 23 and 24. Similarly as in the embodiment of FIG. 4, sloping surface 17b of each ramp 16b starts at the leading flanks of the narrow projection 25b of the same height as that of the segments and of the ramp. The sensor disc 10b of FIG. 5 is attached to a crank shaft of the engine and the detected signals are applied to a control circuit for an eight cylinder engine.

Figure 6:
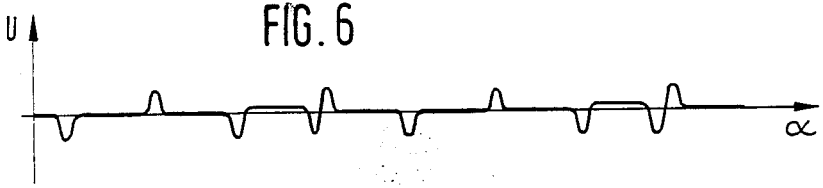
FIG. 6 is a plot diagram of the angular position of the disc of FIG. 5 versus voltage picked up by the detector.

FIG. 6 shows the relationship between the generated signals at the output of detector 20 and the angular position of the sensor disc 10b during its clockwise rotation. The block diagram shows all impulses generated during a complete rotation of the disc 10b, starting with a negative pulse induced by the leading flank of the segment 12b. Depending on the connection of the detector 20, the shown pulses can be also of reversed polarity. Similarly as in the block diagram of FIG. 2C, the induced signal in the range of the sloping surface 17b of the ramp 16b does not fall to zero but has a low positive amplitude. In the embodiment of FIG. 1, upon starting the engine at most one rotation of the disc 10 is necessary for the generation of a marking pulse and its recognition by the evaluation two-circuit. In the embodiment of FIG. 1, the narrow radial projection 25b fastens correct recognition of the correlation of the controlling pulses after the start of the engine.

Figure 7:
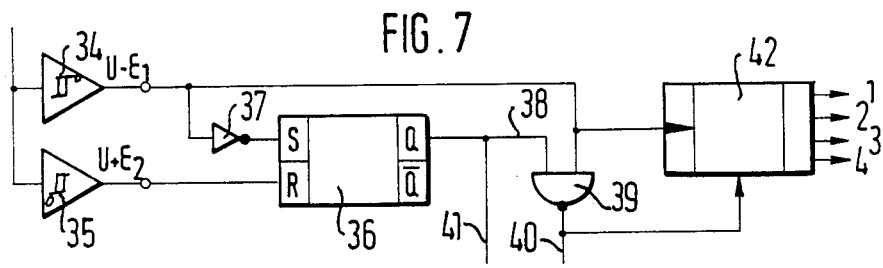
FIG. 7 is a block circuit diagram of a controlling circuit cooperating with the discs of FIGS. 4 and 5.

FIG. 7 shows schematically an evaluation circuit for the sensor disc of FIG. 5 or of FIG. 4. By means of two Schmitt-triggers 34 and 35 each having a different switching threshold, signals generated by detector 20 are transformed into corresponding positive or negative pulses U− and U+ applied to terminals E1 and E2. The input terminal E2 which is supplied with the positive pulse U+ is connected to the reset input of a flip-flop 36. The input terminal E1 supplied with a negative pulse U− is connected via an inverter 37 to the setting input of the flipflop 36. The non-inverted output Q of the flipflop is connected via conduit 38 to one input of a NAND-gate 39. The other input of the NAND-gate is connected to the terminal E1 after the counting input of a counter 42. The output of NAND-gate 39 delivers via a conduit 40 a synchronizing pulse to a non-illustrated synchronizing input of a microcomputer. Conduit 41 connects the Q output of the flipflop 36 to another input of the microcomputer.

The output of the NAND-gate is further connected to an inverting reset input of the counter 42. The outputs of the counter 42 are connected to the ignition control of corresponding groups of cylinders of the engine. In an eight cylinder engine four outputs are necessary.

Figure 9:
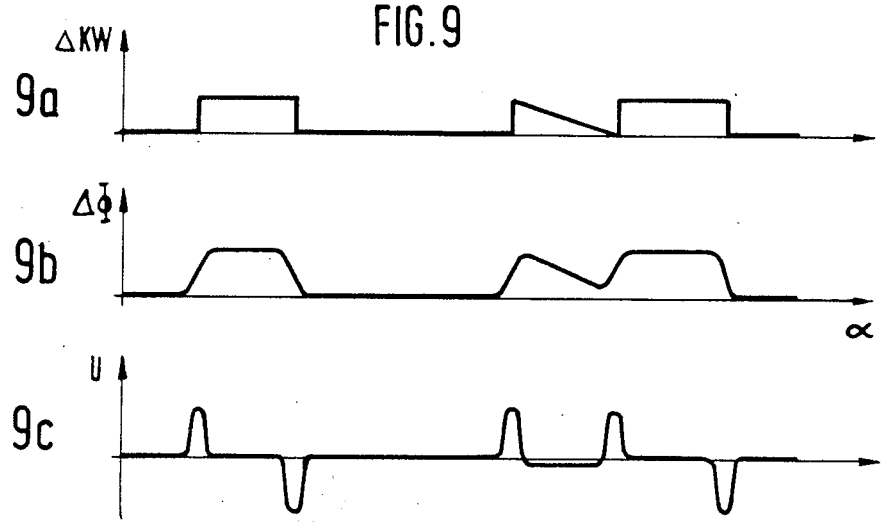
FIG. 9 shows operational diagrams of the position sensor of FIG. 8.
Figure 10:
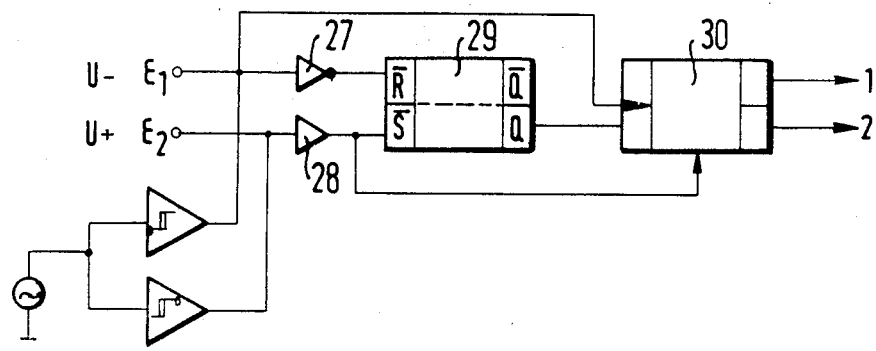
FIG. 10 is a schematic block diagram of the controlling circuit for processing the pulses picked-up by the detector of the position sensor of FIG. 8.

FIG. 9 shows the time course of the controlling signals generated by the angular position sensor of FIG. 8. The diagrams are similar to those of FIG. 2 except for the additional or marking pulse of positive polarity (FIG. 9c) due to the descending ramp 16a. According by the positive signal U+ is applied to the input terminal E2 and the negative signal to the input terminal E1 of the controlling circuit 21, as shown in FIG. 10.

While the invention has been illustrated and described as embodied in specific embodiments of angular position sensors for use with control devices for an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for controlling operation of an internal combustion engine of a motor vehicle having a rotary shaft and means for sensing angular position of the shaft, said sensing means including a sensor disc arranged for joint rotation with the shaft and having on its periphery a plurality of radially projecting segments whose number is proportional to the number of cylinders of the engine, and each having a steep leading and a steep trailing flank, a stationary detector cooperating with the flanks of respective segments to generate control pulses, said detector being connected to a circuit for controlling ignition and/or fuel injection of the engine, said sensor disc having a single sloping ramp which is arranged in a gap between two segments, said ramp having a steep flank facing a flank of one or said two segments; and said detector cooperating with said ramp to generate a marking signal applied to said controlling circuit to indicate position of said rotary shaft.

2. A device as defined in claim 1, wherein said ramp has a surface ascending in the direction of rotation of said sensor disc from a trailing flank of one of said two segments and terminating with a steep flank at a distance from the leading flank of the other segment.

3. A device as defined in claim 1, wherein said ramp has a surface descending in the direction of rotation of said disc toward a leading flank of one of said two segments and terminating with a steep flank spaced apart from the trailing flank of the other segment.

4. A device for controlling operation of an internal combustion engine of a motor vehicle having a rotary shaft and means for sensing angular position of the shaft, said sensing means including a sensor disc arranged for joint rotation with the shaft and having on its periphery a plurality of radially projecting segments whose number is proportional to the number of cylinders of the engine, said segments being spaced apart one from the other and each having a steep leading and a steep trailing flank, all segments being of uniform angular interval and at least one segment being of uniform diameter, a stationary detector cooperating with the flanks of said segments to generate control pulses, said detector being connected to a circuit for controlling ignition and/or fuel injection of the engine, comprising a sloping ramp formed in at least one remaining segment of the disc, said ramp defining a steep flank coinciding with a flank of said one remaining segment and a sloping surface terminating at a base of an inner flank of a narrow projection whose outer flank coincides with the other flank of said one remaining segment.

5. A device as defined in claim 4, comprising two diametrically opposed segments of uniform diameter and two diametrically opposed remaining segments each provided with sloping ramp and the associated narrow projection.

6. A device as defined in claim 4, wherein said sensor disc is connected to a crank shaft of the engine in such an angular position that said narrow projection passes said detector in the upper dead center point of said crank shaft.

* * * * *